A. AICHELE.
APPARATUS FOR OPERATING THE SLIDING WHEELS OF CHANGE SPEED GEARS.
APPLICATION FILED APR. 26, 1920.

1,379,891. Patented May 31, 1921.

Inventor
Albert Aichele
per
C. W. Fairbank
Attorney

UNITED STATES PATENT OFFICE.

ALBERT AICHELE, OF BADEN, SWITZERLAND.

APPARATUS FOR OPERATING THE SLIDING WHEELS OF CHANGE-SPEED GEARS.

1,379,891.

Specification of Letters Patent. Patented May 31, 1921.

Application filed April 26, 1920. Serial No. 376,569.

*To all whom it may concern:*

Be it known that I, ALBERT AICHELE, a citizen of the Swiss Republic, residing at Baden, Switzerland, have invented certain new and useful Improvements in Apparatus for Operating the Sliding Wheels of Change-Speed Gears, of which the following is a specification.

In speed-changing gears whose toothed wheels for producing noiseless working are formed with oblique teeth, particular attention must be paid to the fact that the actuating levers shall be relieved of the axial thrust due to the obliquity of the teeth of the sliding gear wheel. This axial thrust would not only result in constant frictional losses between the shifting forks and the sleeve-like hubs of the change wheels, but would also exert a permanent pressure upon the hand lever which the operator is not able to overcome. With the gearing employed in a motor vehicle the direction of axial thrusts changes according as the vehicle is traveling on a level road or ascending or descending a grade, and this change in direction of thrusts results in a tendency of the sliding gear to move endwise out of mesh or to increase the power necessary to move it out of mesh.

This objection is obviated according to the present invention by an automatic locking apparatus for locking the sliding change wheel to its shaft when in mesh and to its operating sleeve when out of mesh. These two locking operations are effected by means of the same locking members which are located in radial apertures in a hub of the sliding wheel, and are thicker radially than the radial thickness of the said hub.

In the operation of this construction when the change wheel is out of gear, the locking members act to couple the hub of the said change wheel to the sliding hub, and when the wheel is in gear, to couple the hub of the latter to the shaft, so that when the gear wheels are in mesh the axial thrust is transmitted by the locking members to the shaft, so that the sliding hub and with it the operating rodding is relieved of thrust.

This invention will now be described more fully with reference to a constructional example.

In the accompanying drawings:—

Figure 1:
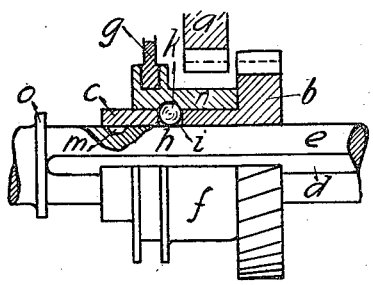
Figure 1 is a side elevation, partly in longitudinal section, of a device embodying my invention, the gears being shown out of mesh.
Figure 4:
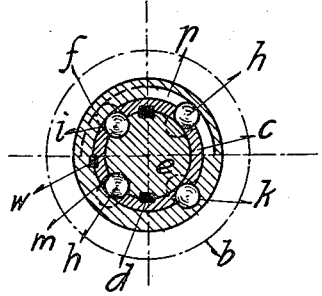
Fig. 4 is a transverse section, the left half being in the plane of the recess of the shaft and the lower half in the plane of the recess of the operating sleeve.
Figure 2:
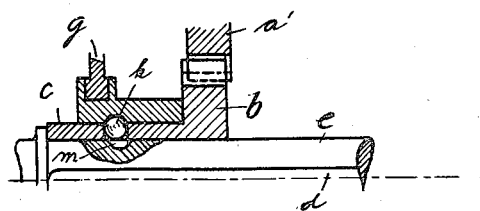
Fig. 2 is a view similar to a portion of Fig. 1, but showing the gear in mesh but not locked.
Figure 3:
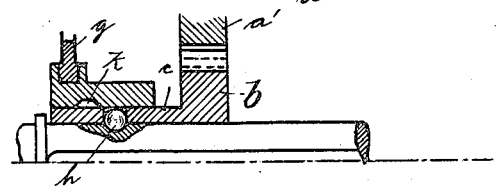
Fig. 3 is a similar view showing the parts in final locked mesh position.

Figs. 1 to 3 illustrate a pair of obliquely toothed gear wheels $a$ and $b$ which are to be brought into mesh with each other. The sliding wheel $b$ has its extended sleeve-like hub $c$ along the shaft $e$ provided with a feather key $d$. The hub $c$ is surrounded by a sleeve $f$ to which sliding movement is imparted by means of a lever $g$. The operating sleeve $f$ may be coupled to the wheel hub $c$ by means of a locking ball (or a plurality of locking balls $h$ arranged around the periphery as shown in Fig. 4). Each of these balls fills a radial hole in the wheel hub and its projecting portion may engage in a recess $k$ formed in the operating sleeve $f$, and having an inclined wall. The shaft $e$ has at another point a corresponding recess $m$ also with an inclined wall.

Fig. 1 shows the gear in the position of rest in which the gear wheels $a$ $b$ are out of mesh. In this position the operating sleeve $f$ has its end $n$ abutting against the body of the wheel $b$. If now, for the purpose of bringing the wheels into mesh with each other, the sleeve $f$ be moved to the left by means of the lever $g$, the sleeve $f$ and hub $c$ will remain coupled together until the two gear wheels are completely in mesh with each other. In this position the wheel hub $c$ abuts against a collar $o$ of the shaft $e$, (Fig. 2). Upon the further movement of the sleeve $f$ from the position shown in Fig. 2 to the position shown in Fig. 3, the ball is free to move inward radially from the recess $k$ into the recess $m$ of the shaft $e$. The side of the recess $k$ forms a cam for effecting this action. With the ball in the recess $m$ the sleeve is free to continue moving in respect to the wheel hub $c$ and to lock the ball in its inner position and lock the wheel hub to the shaft.

In moving the toothed wheel $b$ out of mesh, first only the operating sleeve $f$ is slid to the right. When it passes out of the position shown in Fig. 3, and its end $n$ strikes the wheel $b$, the three apertures $m$, $i$ and $k$ will be located one above the other, as shown in Fig. 2, and since now the wheel $b$ will be carried along in the continual advance of the operating sleeve $f$, the incline of the recess $m$ as well as centrifugal action, will force the locking ball $h$ outward, so that it now couples again the hub $c$ and the sleeve $f$, while it itself is locked by the smooth portion of the shaft. As will be seen, the axial thrust is not taken by the collar $o$ of the shaft $e$ (Fig. 3) but is transmitted from the wheel hub $c$ directly to the shaft $e$ by means of the locking ball $h$.

Fig. 4 is a cross section of an apparatus as shown in Figs. 1 to 3, the left half being a section through the recesses $m$ of the shaft $e$, while the right hand half is a section through the recesses $k$ of the operating sleeve $f$. If the operating sleeve $f$ is keyed to rotate with the other parts, the recesses $k$ may be limited to determined points on the inner periphery of the sleeve, as indicated in the lower half of Fig. 4, but in such a case a special guide feather $w$ must be provided which will cause the sleeve $n$ to rotate in the unlocked position shown in Fig. 3. If, on the contrary, the operating sleeve $f$ can not rotate, then the recesses must be constructed in the form of an annular groove $p$ as shown in the top half of Fig. 4.

Figure 5:
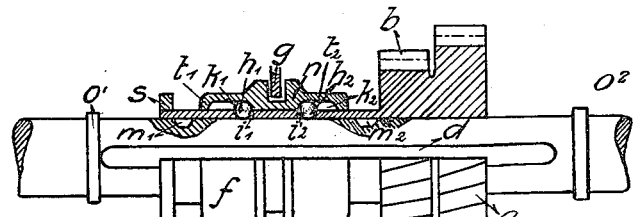
Fig. 5 is a view similar to Fig. 1, but showing a modified construction.

When it is desired to shift the change wheel from a position of rest into two different positions of operation, use may be made as shown in Fig. 5 of two rows of locking members, and consequently the operating sleeve $f$ must be made double-ended.

As shown in Fig. 5, either the toothed wheel $b$ is to be moved by sliding to the left into mesh with the toothed wheel $a$, or the toothed wheel $q$ is to be moved by sliding to the right into mesh with the toothed wheel $r$. For the two working positions of the wheels $b$ and $q$, the shaft $e$ is formed with two rows of recesses $m^1$ and $m^2$. The locking balls $h^1$ engage in the row of recesses $m^1$, and the locking balls $h^2$ engage in the row of recesses $m^2$ according as the operating sleeve $f$ is shifted to the left or to the right on to the wheel hub $c$. Since the part $n$ of the operating sleeve $f$ which covers and thereby locks the locking balls in their working position, is common to both positions of operation and is located in the center of the sleeve, the two rows of recesses $k^1$ and $k^2$ are extended in the axial direction.

In shifting the operating sleeve $f$ out of the position of rest shown in the figure, the wheel hub $c$ is moved along by the corresponding row of locking balls into its position of operation, that is to say, to the left until it strikes against the collar $o^1$, and to the right until it strikes against the collar $o^2$. The balls of the operating series are then forced into the corresponding recesses $m^1$ or $m^2$ of the shaft $e$, whereupon the operating sleeve is forced farther until it strikes either on the left against the collar $s$ or on the right against the wheel $b$ and thus locks by means of its part $n$ the balls in the position of operation.

The engagement with a collar $s$ or with the wheel $b$ is unnecessary when as shown in Fig. 5, the recesses $k^1$ and $k^2$ are closed at their outer ends by portions $t^1$ and $t^2$ of the wall of the sleeve, because in that case the inoperative row of balls prevents the sleeve $f$ from being pushed beyond the rows of balls.

Instead of balls, other shaped members may be employed as locking members, for instance hammer-shaped locking members that are connected by means of movable joints to the operating sleeve.

It is obvious that other constructions besides those illustrated may be employed.

What I claim is:—

1. In a change-speed gear, the combination with a sliding wheel, a shaft along which it is adapted to slide, and a sleeve for shifting said sliding wheel along said shaft, of an extended hub on said sliding wheel located concentrically around said shaft between the latter and said sleeve, one recess in the inner surface of said sleeve, a recess in the periphery of said shaft, a hole extending radially through the thickness of said hub, and a locking member having a radial thickness exceeding the radial thickness of said hub and located in said hole, whereby when said sliding wheel is out of mesh, said wheel is locked to said sleeve by said locking member projecting into the recess of said sleeve, whereas when said sliding wheel is in mesh it is locked to said shaft by said locking member projecting into the recesses of said shaft, and also whereby when said sliding wheel is in mesh, the axial thrust of the intermeshing wheels is taken by said locking member and transmitted to said shaft, and said sleeve is relieved thereby of said axial thrust.

2. In an apparatus for operating the sliding wheel of a change-speed gear with oblique teeth, the combination of locking mechanism of the type specified in claim 1, in symmetrical duplication for the purpose of locking said sliding wheel in two positions of operation located on either side of its position of rest or non-mesh.

3. In an apparatus for operating the sliding wheel of a change-speed gear with oblique teeth, the combination as specified in claim 2 with the additional feature that the extended hub of said sliding wheel is provided with a stop at each end of the sliding path of the sleeve.

4. In an apparatus for operating the sliding wheel of a change-speed gear with oblique teeth, the combination as specified in claim 2 with the additional feature that the recesses provided in the driving sleeve for the locking members are extended parallel to the axis for a determined distance on both sides of the central transverse plane of said driving sleeve, said distance being such that said sleeve is capable of being slid for a determined distance beyond the said locking members projecting into said recesses.

5. In an apparatus for operating the sliding wheel of a change-speed gear with oblique teeth, the combination with said sliding wheel, a shaft along which said sliding wheel is adapted to slide, and a non-rotatable sleeve for shifting said sliding wheel along said shaft, of an extended hub on said sliding wheel located concentrically around said shaft between the latter and said non-rotatable sleeve, one or more annular grooves in the inner surface of said non-rotatable sleeve, a corresponding number of recesses in the periphery of said shaft, a corresponding number of holes extending right through the thickness of said hub, and a corresponding number of locking members (such as balls) having a radial thickness exceeding the radial thickness of said hub, located in said holes of said hub, whereby when said sliding wheel is out of mesh, said wheel is locked to said non-rotatable sleeve by said locking members projecting from the recesses of said hub into the annular grooves of said sleeve, whereas when said sliding wheel is in mesh with the selected gear wheel, said sliding wheel is locked to said shaft by said locking members projecting from the recesses of said hub into the recesses of said shaft, and also whereby when said sliding wheel is in mesh with the selected gear wheel, the axial thrust of the intermeshing wheels is taken by said locking members and transmitted to said shaft, and said sleeve is relieved thereby of said axial thrust.

In testimony whereof I have signed my name to this specification.

ALBERT AICHELE.